(12) United States Patent
Mochizuki et al.

(10) Patent No.: US 6,211,464 B1
(45) Date of Patent: Apr. 3, 2001

(54) GROMMET HAVING RESILIENT FLANGE FOR MOUNTING ON A PANEL

(75) Inventors: Yasunari Mochizuki; Nobutaka Kaneko; Hiroki Goto; Hiroaki Arai, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/315,405

(22) Filed: May 20, 1999

(30) Foreign Application Priority Data

May 20, 1998 (JP) .................................................. 10-138618
Dec. 21, 1998 (JP) .................................................. 10-362947

(51) Int. Cl.$^7$ ...................................................... H02G 3/18
(52) U.S. Cl. .......................... 174/65 G; 16/2.1; 248/56; 174/135
(58) Field of Search ............................ 174/65 G, 153 G, 174/152 G, 152 R, 135; 16/2.1, 2.2; 248/56; 439/604

(56) References Cited

U.S. PATENT DOCUMENTS

| 5,526,549 | * | 6/1996 | Mori et al. . | |
| 5,531,459 | * | 7/1996 | Fukuda et al. | 277/178 |
| 5,856,635 | * | 1/1999 | Fujisawa et al. | 174/153 G |
| 5,981,877 | * | 11/1999 | Sakata et al. | 174/153 G |
| 6,058,562 | * | 5/2000 | Satou et al. | 16/2.1 |
| 6,064,003 | * | 5/2000 | Moore et al. | 174/65 G |
| 6,088,874 | * | 7/2000 | Nakata et al. | 16/2.1 |

FOREIGN PATENT DOCUMENTS

| 1294516 | * | 11/1972 | (GB) | 174/153 G |
| 8-212857 | | 8/1996 | (JP) | H01B/17/58 |

* cited by examiner

*Primary Examiner*—Kristine Kincaid
*Assistant Examiner*—Dhiru R Patel
(74) *Attorney, Agent, or Firm*—Sughrue, Mion, Zinn, Macpeak & Seas, PLLC

(57) ABSTRACT

A grommet is provided for positively and easily mounting a longitudinally shaped member (e.g. a wire harness) in such a manner that the member is passed through a mounting plate such as a panel of a vehicle body. The grommet includes a second cylindrical portion connected through a connection portion to a first cylindrical portion for passing a wire harness therethrough. A groove, formed in an outer peripheral surface of the second cylindrical portion, and flange portions, formed between the groove and the connection portion, maintain the angle of projection of the flange portions with respect to the second cylindrical portion. The second cylindrical portion is turned inside out, so that the flange portions, deformed into a generally tapering, cylindrical shape, are passed through a mounting hole, and then the second cylindrical portion is restored into its initial shape, so that the grommet is located on the panel in a predetermined position.

8 Claims, 13 Drawing Sheets

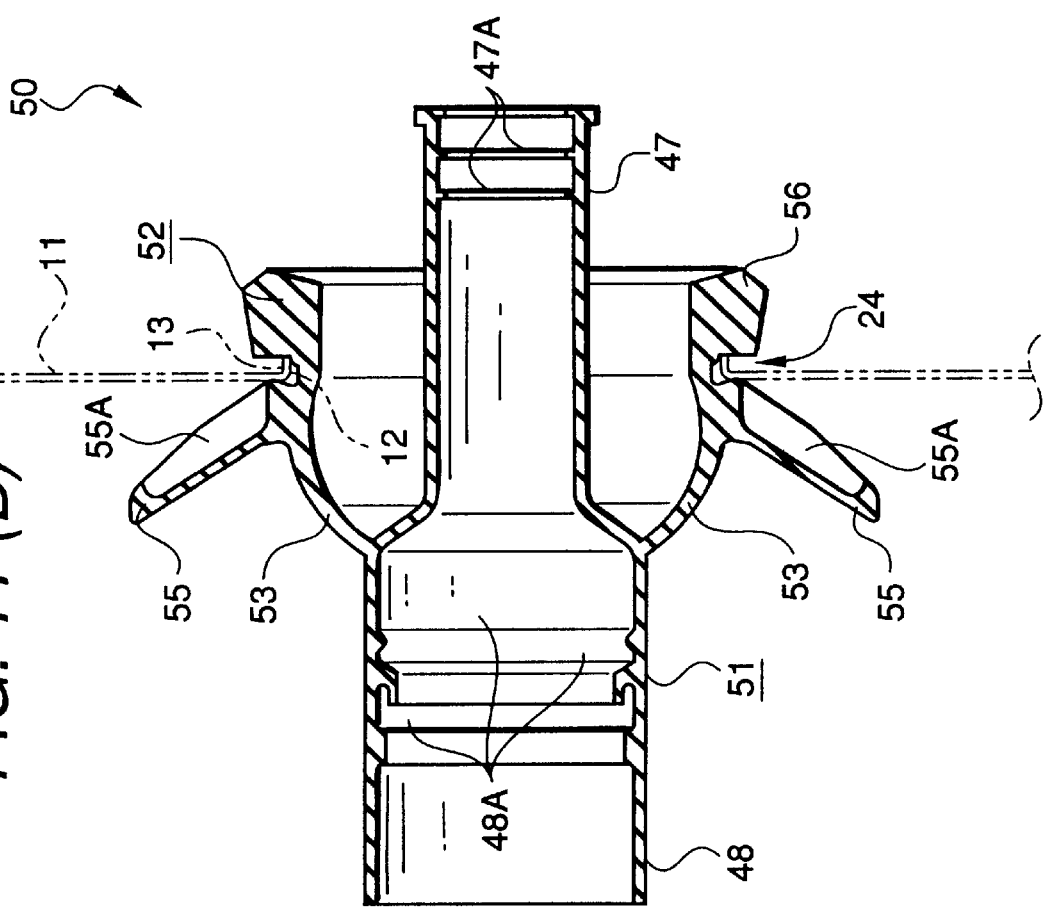
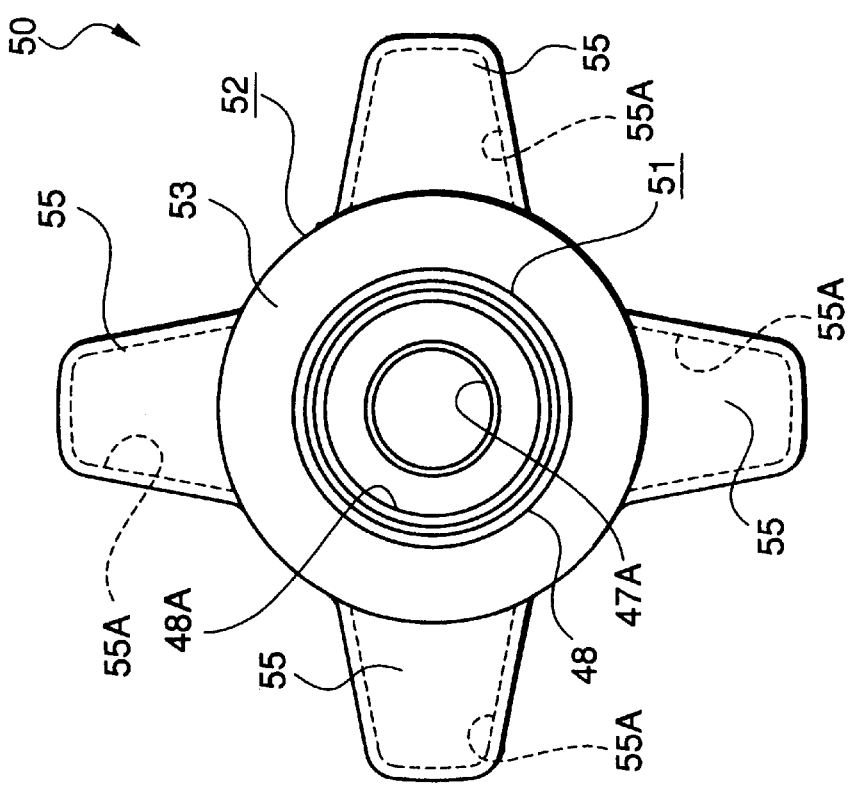
FIG. 11 (B)
FIG. 11 (A)

GROMMET HAVING RESILIENT FLANGE FOR MOUNTING ON A PANEL

BACKGROUND OF THE INVENTION

1. Field of the Invention

This invention relates to a grommet, and more particularly to a grommet which enables an elongated member (e.g. a wire harness) to be positively and easily passed through and retained relative to a mounting plate such as a panel of a vehicle body.

2. Description of the Prior Art

There have heretofore been proposed various grommets which enable a wire harness to be passed through and mounted on a panel of a car body of an automobile. The Applicant of the present application has proposed a grommet (Japanese Patent Unexamined Publication No. 8-212857: conventional example) which includes a smaller-diameter tubular portion for fitting on a wire harness, a larger-diameter tubular portion for fitting in a mounting hole, a tapering tubular portion interconnecting the smaller-diameter and larger-diameter tubular portions, and a groove edge portion and holding piece portions which are provided at an outer peripheral surface of the larger-diameter tubular portion.

In this example, the larger-diameter tubular portion is turned inside out, with its inner peripheral surface directed outwardly, and by doing so, the holding piece portions are deformed into a generally tapering, cylindrical shape, and are passed through the mounting hole, and subsequently the smaller-diameter portion is drawn into the mounting hole, and as a result, because of a resilient force tending to restore the holding piece portions into their initial shape, the larger-diameter portion is restored into its initial shape in such a manner that the groove edge portion is engaged in a peripheral edge of the mounting hole. Therefore, the wire harness can be easily and positively mounted with a smaller force.

In the above example, a plurality of tongues, serving as the holding piece portions, extend radially from the outer peripheral surface of the larger-diameter tubular portion. These tongues have a relatively small thickness, and therefore even when the tongues are deformed into a generally tapering (or convergent) cylindrical shape, and then passed through the mounting hole, a sufficient resilient force is not obtained to restore the larger-diameter tubular portion into its initial shape.

Namely, in this grommet, the operator must perform an auxiliary operation to draw the smaller-diameter tubular portion into the mounting hole until the groove portion is brought into fitting engagement in the inner peripheral edge of the mounting hole. In view of this problem, there has been desired an improvement to make the wire harness-mounting operation simpler.

SUMMARY OF THE INVENTION

This invention has been made in view of the above problems, and an object of the invention is to provide a grommet for mounting a member (e.g. a wire harness) easily and positively in such a manner that the member is passed through a mounting plate such as a panel of a vehicle body.

The above object has been achieved by a grommet for passing and holding a member relative to a mounting hole formed through a mounting plate, which comprises a first cylindrical portion for passing the member therethrough, a second cylindrical portion connected to the first cylindrical portion through an annular connection portion formed on an outer peripheral surface of the first cylindrical portion, a groove portion formed in an outer peripheral surface of the second cylindrical portion, and a flange portion formed on that portion of the outer peripheral surface of the second cylindrical portion lying between the groove portion and the connection portion. The second cylindrical portion is turned inside out, with its inner peripheral surface directed outwardly, so that a peripheral edge of the flange portion is inserted into the mounting hole, and then the second cylindrical portion is restored into its initial shape, so that the first cylindrical portion is passed through the mounting hole, and the groove portion is fitted on an inner peripheral edge of the mounting hole. With this structure, the angle of projection of the flange portion relative to the outer peripheral surface of the second cylindrical portion can be maintained.

The first cylindrical portion need only to have an inner diameter corresponding to an outer diameter of the long member such as a wire harness, and this inner diameter may be a little smaller so that the long member can be press-fitted into the first cylindrical portion. This first cylindrical portion does not need to have a uniform inner diameter or a uniform outer diameter over the entire length thereof, and, for example, may be a stepped, cylindrical shape or a tapering, cylindrical shape.

The connection portion need only to radially extend from the predetermined portion of the outer peripheral surface of the first cylindrical portion over the entire circumference thereof, and for example, this connection portion is formed into a flat ring-shape or a generally conical shape.

The second cylindrical portion need only to have an outer diameter corresponding to the inner diameter of the mounting hole, and the proximal end of this second cylindrical portion is connected to the peripheral edge of the connection portion.

Therefore, for example, the first cylindrical portion and the second cylindrical portion may be arranged in a telescopic manner, or may be serially arranged in the axial direction through the connection portion.

The first cylindrical portion, the connection portion and the second cylindrical portion may be formed integrally with one another, using a synthetic resin having a suitable degree of elasticity and water resistance. However, these portions may be separate from each other in so far as the second cylindrical portion can have a suitable degree of elasticity and water resistance.

The flange portion may comprise an annular flange, formed on the outer peripheral surface of the second cylindrical portion over the entire circumference thereof, or may comprise a plurality of flange portions spaced a predetermined distance from one another in the circumferential direction.

The flange portion can be larger in thickness than the second cylindrical portion, and this flange portion can include a predetermined metal plate insert molded in a resin.

In the grommet of this construction, the angle of projection of the flange portion relative to the outer peripheral surface of the second cylindrical portion can be maintained. Therefore, the second cylindrical portion is inverted, and then when the open end thereof is pressed against the mounting plate, so that the flange portion is deformed into a tapering shape, there is produced a larger resilient force, tending to restore the flange portion into its initial shape, as compared with the conventional construction.

Namely, in this grommet, when the flange portion, deformed into a tapering shape, is passed through the mounting hole, the second cylindrical portion is restored into its initial shape by itself in such a manner that the groove portion is fitted on the inner peripheral edge of the mounting hole. Therefore, an auxiliary operation by the operator as in the conventional construction is not necessary, and the long member (e.g. a wire harness) mounting operation can be simplified as compared with the conventional construction.

A plurality of flange portions may extend radially from the outer peripheral surface of the second cylindrical portion, and the flange portions may have a thickness larger than a thickness of the second cylindrical portion.

The flange portions may be arranged at equal intervals, or may be arranged at unequal intervals.

In this grommet, the thickness of the flange portions is larger than the thickness of the second cylindrical portion. Therefore, the second cylindrical portion is inverted, and then when the open end thereof is pressed against the mounting plate, the flange portions are deformed to jointly assume a generally-tapering tubular shape, with their distal ends moved toward each other. At this time, as compared with the case where a flange portion of an annular, continuous shape is formed, irregular wrinkles are less liable to be formed on the surfaces of the flange portions of this grommet, and therefore radial, uniform resilient forces can be obtained.

Therefore, in this grommet, the resilient forces, tending to restore the second cylindrical portion into its initial shape, can be produced radially uniformly, and therefore there is little possibility that the groove portion is fitted obliquely on the inner peripheral edge of the mounting hole, and thus, this groove portion can be properly fitted thereon.

In the present invention, an engagement portion may be formed on the outer peripheral surface of the second cylindrical portion, and tapered from the groove portion toward the distal end of the second cylindrical portion.

In this grommet, the engagement portion, tapering from the groove portion toward the distal end, is beforehand formed, and therefore when the second cylindrical portion is inverted, the engagement portion is tapering from the end of the inner peripheral surface in the axial direction.

Therefore, for example, in the case where a flange is formed on the peripheral edge portion of the mounting hole, the axis of the mounting hole is substantially aligned with the axis of the second cylindrical portion by the engagement portion when the inverted second cylindrical portion is fitted on this flange, and therefore the groove portion can be uniformly fitted on the inner peripheral edge of the mounting hole.

In the present invention, the thickness of the connection portion may be smaller than the thickness of the second cylindrical portion. With this construction, the connection portion, having a low shape-retaining strength, can be easily inverted, and therefore the second cylindrical portion can also be easily turned inside out.

The flange portion can be shaped so as to project and be disposed on an imaginary conical surface spreading toward an open end of the first cylindrical portion.

In this grommet, the flange portion is slanted toward the mounting hole, and therefore as compared with the case where the flange portion projects perpendicularly to the axis of the second cylindrical portion, the flange portion can be deformed into a tapering shape without completely turning the second cylindrical portion inside out, and therefore the flange portion can be easily inserted into the mounting hole.

A rib may be formed on a sliding-contact surface of the flange portion which can be brought into sliding contact with the inner peripheral edge of the mounting hole, and the rib can be continuous from the proximal end of the flange portion to the distal end thereof.

The second cylindrical portion is designed to be turned inside out, and in view of this, the sliding-contact surface is defined by that surface of the flange portion directed toward the open end of the second cylindrical portion.

It is only necessary that the rib can be brought into sliding contact with the inner peripheral edge of the mounting hole in a continuous manner, and the rib may be have a linear shape, a curved shape, an angular shape, a closed-loop shape or others. In the case where a plurality of ribs are formed, the ribs may be disposed parallel to each other, or may be arranged in an intersecting manner.

The rib may have a generally triangular cross-section so that it can be disposed in line-contact with the inner peripheral edge of the mounting hole. Alternatively, the rib may have a rectangular cross-section so that it can be disposed in surface-to-surface contact with the inner peripheral edge of the mounting hole. The rib may be formed by thickening a relevant portion of the flange portion of a predetermined thickness in the direction of the thickness of this flange portion, or by thinning a relevant portion of the flange portion of a predetermined thickness in the direction of the thickness of this flange portion.

In this grommet, since the rib is formed on the sliding-contact surface of the flange portion, the area of sliding contact of the flange portion with the inner peripheral edge of the mounting hole is smaller as compared with the case where the flange portion has a flat surface.

Namely, in this grommet, as compared with the type of grommet in which a sliding-contact surface of a flange portion is flat, an insertion resistance is smaller, wherein the resistance develops when inserting the flange portion that is deformed into a tapering shape into the mounting hole.

The flange portion may be higher in hardness than the second cylindrical portion.

The second cylindrical portion and the flange portion can be made of suitable rubber which is excellent in water resistance, oil resistance, corrosion resistance, insulating properties, elasticity and so on. The flange portion may have a hardness so that the flange portion can retain its position relative to the second cylindrical portion, its shape, and the direction of projection thereof against an external force smaller than a predetermined value.

In such a grommet, the hardness of the flange portion is made high, for example, by multicolor injection molding. Alternatively, the grommet is formed by injection molding rubber of the thermosetting type, the photo-setting type, the ultrasonic curing type, and then by applying heat, light and ultrasonic waves to the flange portion, thereby increasing the hardness of the flange portion.

The flange portion and the second cylindrical portions may be formed separately from each other, using different materials, in which case the flange portion and the second cylindrical portion are connected together by adhesive bonding, fusion, ultrasonic welding or others.

The hardness of the flange portion is higher than the hardness of the second cylindrical portion, and therefore the flange portion is deformed in a tapering manner by applying an external force not less than a predetermined value, and is passed through the mounting hole, and then when the external force is released, larger resilient forces, tending to restore the second cylindrical portion into its initial shape, are produced as compared with the case where the flange portion is equal in hardness to the second cylindrical portion, and as a result the groove portion can be positively fitted properly.

BRIEF DESCRIPTION OF THE DRAWINGS

FIGS. 11(A) and (B) are a plan view and a cross-sectional view, respectively, of a third embodiment of a grommet of the present invention;

DETAILED DESCRIPTION OF THE PREFERRED EMBODIMENTS

A preferred embodiment of the present invention will now be described in detail with reference to the drawings.

Figure 1:
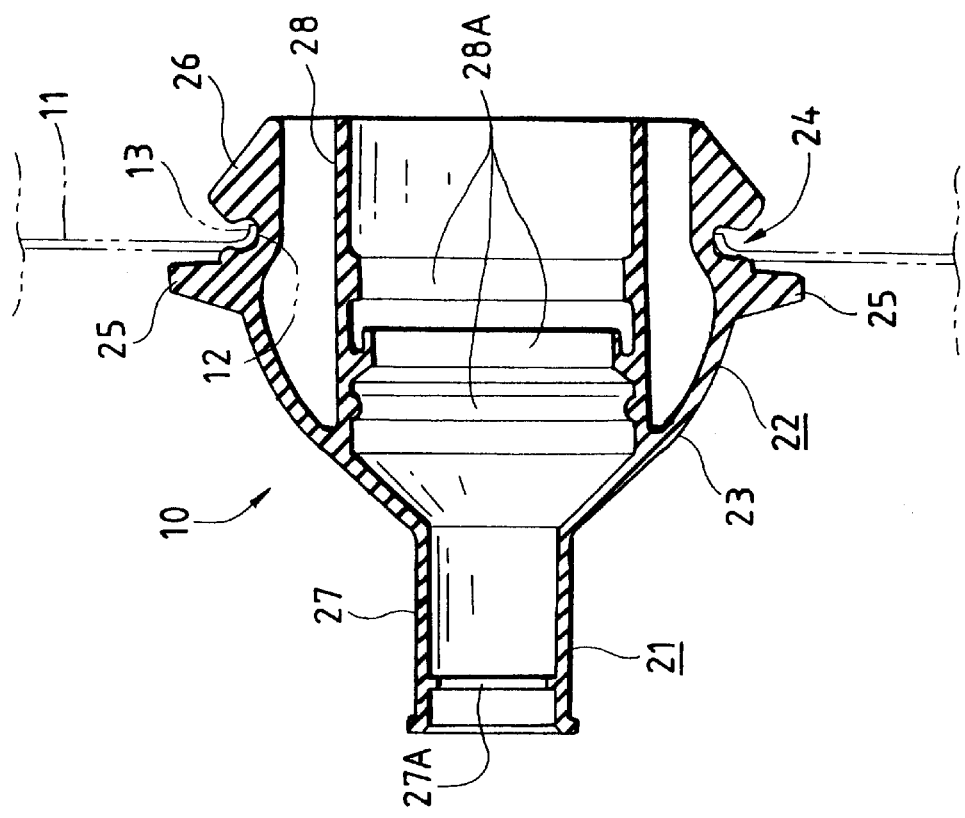
FIGS. 1(A) and 1(B) are a plan view and a cross-sectional view, respectively, of a first embodiment of a grommet of the present invention.
Figure 1:
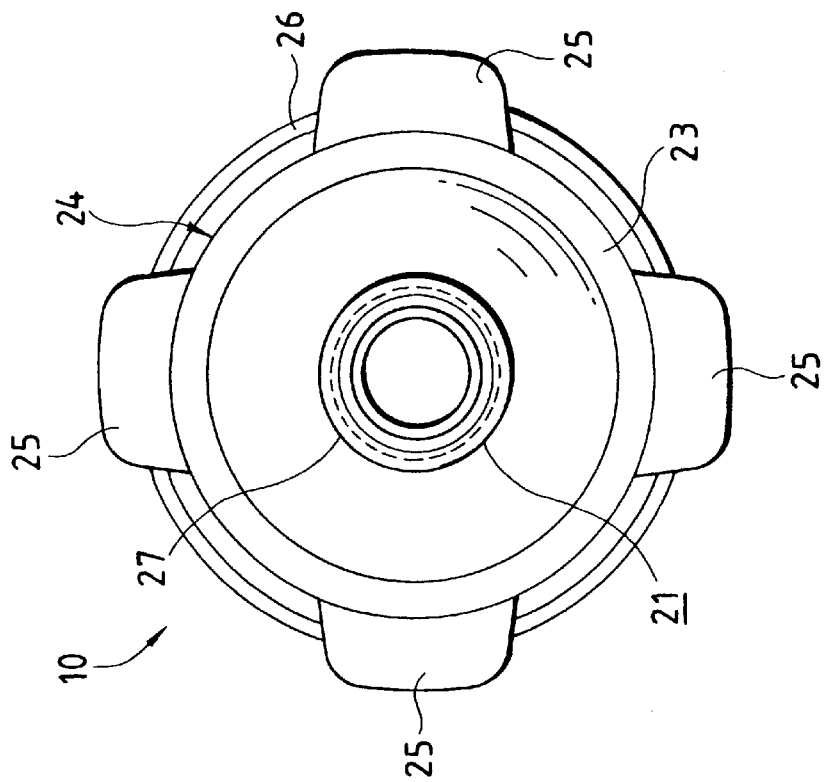
Figure 2:
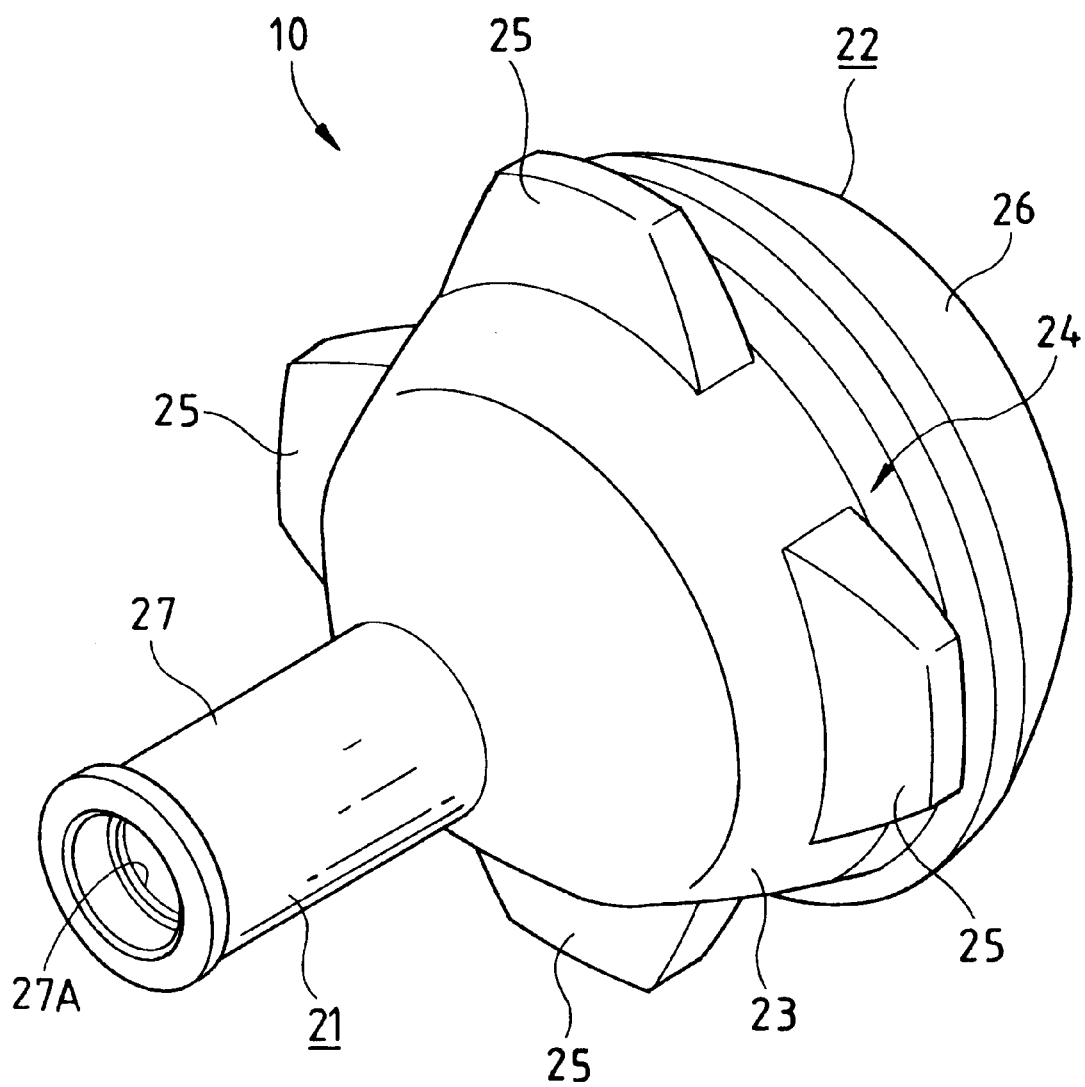
FIG. 2 is a perspective view showing the grommet of FIGS. 1(A) and (B)

As shown in FIGS. 1(A), 1(B) and 2, a wire harness (not shown) can be passed through and mounted on a car body panel 11 of an automobile, by a grommet 10, according to a first embodiment of the present invention, fitted in a mounting hole 12 formed through the car body panel 11 with the wire harness passed through and held by this grommet. The mounting hole 12 has a circular shape, and a flange 13 of a predetermined height is formed on a peripheral edge of the mounting hole 12.

The grommet 10 includes a first cylindrical portion 21 for passing the wire harness therethrough, an annular connection portion 23 formed on an outer peripheral surface of the first cylindrical portion 21, a second cylindrical portion 22 connected to the first cylindrical portion 21 through the connection portion 23, a groove 24 formed in an outer peripheral surface of the second cylindrical portion 22, flange portions 25 formed on that portion of the outer peripheral surface of the second cylindrical portion 22 lying between the groove 24 and the connection portion 23, and a tapering engagement portion 26 formed on that portion of the outer peripheral surface of the second cylindrical portion 22 extending from the groove 24 to an open end of the second cylindrical portion 22.

The grommet 10 is made of a synthetic resin having a suitable degree of elasticity and water resistance, and the first cylindrical portion 21 and the second cylindrical portion 22 are formed integrally with each other.

The first cylindrical portion 21 is formed into a stepped configuration, and has a smaller-diameter portion 27 and a larger-diameter portion 28 which are continuous with each other along a common axis.

The smaller-diameter portion 27 has an inner diameter corresponding to the outer diameter of the wire harness, and an annular rib 27A is formed on an inner peripheral surface thereof.

When the wire harness is press-fitted into the smaller-diameter portion 27, the rib 27A is elastically deformed, and is held in intimate contact with the outer peripheral surface of the wire harness, so that the smaller-diameter portion 27 holds the wire harness in an airtight manner.

The larger-diameter portion 28 has an inner diameter larger than the inner diameter of the smaller-diameter portion 27, and a plurality of annular ribs 28A are formed on an inner peripheral surface of the larger-diameter portion 28.

After the wire harness is press-fitted into the grommet, a predetermined filler is filled in the larger-diameter portion 28, and is solidified, so that the larger-diameter portion 28 holds the wire harness in an airtight manner.

The connection portion 23 is formed into a generally conical shape spreading from the boundary between the smaller-diameter portion 27 and the larger-diameter portion 28 toward the open end of the larger-diameter portion 28.

The second cylindrical portion 22 has an outer diameter corresponding to the diameter of the mounting hole 12, and has an inner diameter larger than the outer diameter of the larger-diameter portion 28, and this second cylindrical portion 22 is connected to the connection portion 23. Therefore, the larger-diameter portion 28 is provided within the second cylindrical portion 22 in generally telescopic relation thereto, with a predetermined space formed therebetween.

The groove 24 for fitting on the flange 13 of the mounting hole 12 has a generally channel-shaped cross-section, and is formed around the entire circumference of the second cylindrical portion 22, and is disposed in a plane perpendicular to the central axis of the second cylindrical portion 22.

The flange portions 25 are formed adjacent to the groove 24, and are disposed in a plane perpendicular to the central axis of the second cylindrical portion 22. The flange portions 25 are generally shaped like a disk divided into four sections so as to extend radially in the circumferential direction, and are spaced about 90 degrees from one another in the circumferential direction. These flange portions 25 are thicker than that portion of the second cylindrical portion 22 to which proximal ends of these flange portions 25 are connected, and the angle of projection of the flange portions 25 relative to the outer peripheral surface of the second cylindrical portion 22 can be easily maintained.

Next, the procedure of mounting the wire harness by the use of this grommet 10 will be described.

First (not shown), the wire harness is passed through the first cylindrical portion 21 of the grommet 10, and the predetermined filler is filled in the larger-diameter portion 28, and is solidified.

Figure 3:
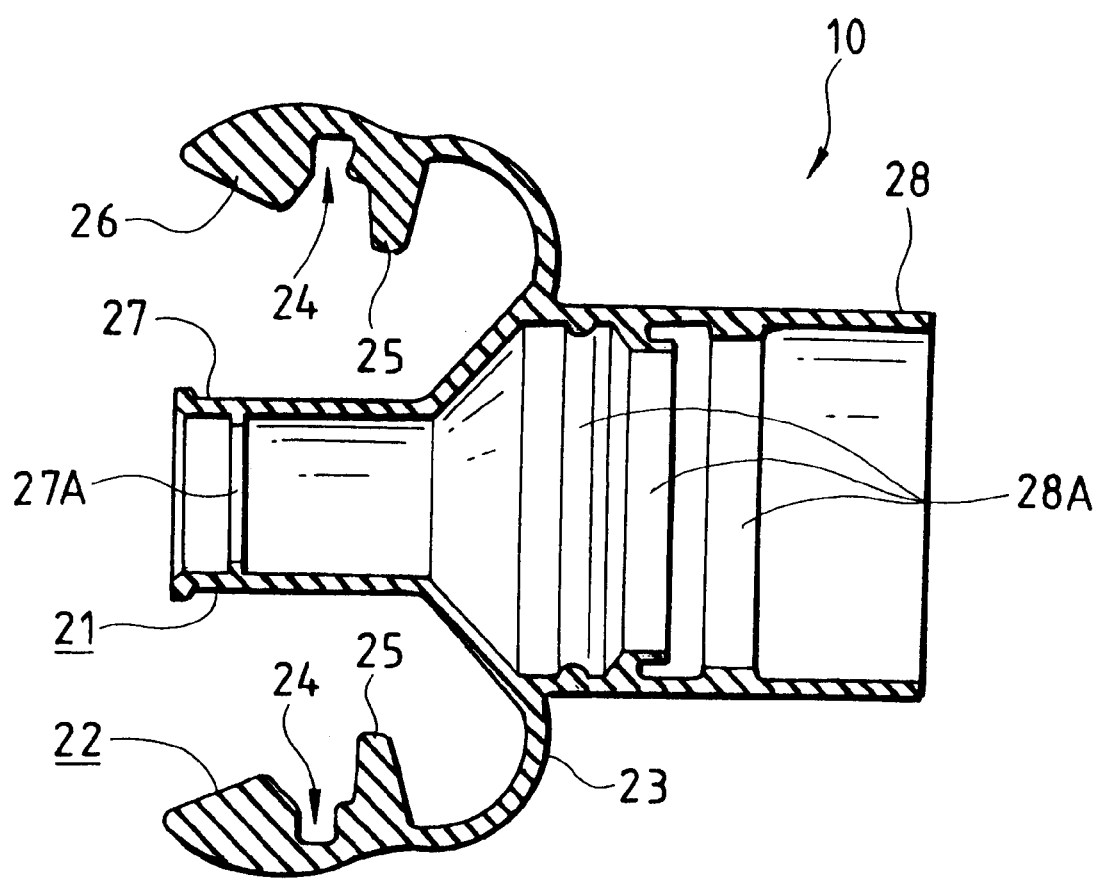
FIG. 3 is a cross-sectional view showing the grommet of FIGS. 1(A) and (B) turned inside out.

Then, as shown in FIG. 3, the second cylindrical portion 22 is turned inside out relative to the first cylindrical portion 21 at a portion adjacent to the connection portion 23, so that the inner peripheral surface of the second cylindrical portion 22 is directed outwardly.

At this time, as a result of deformation of the second cylindrical portion 22, the flange portions 25 are deformed in such a manner that their distal ends are directed toward each other.

Figure 4:
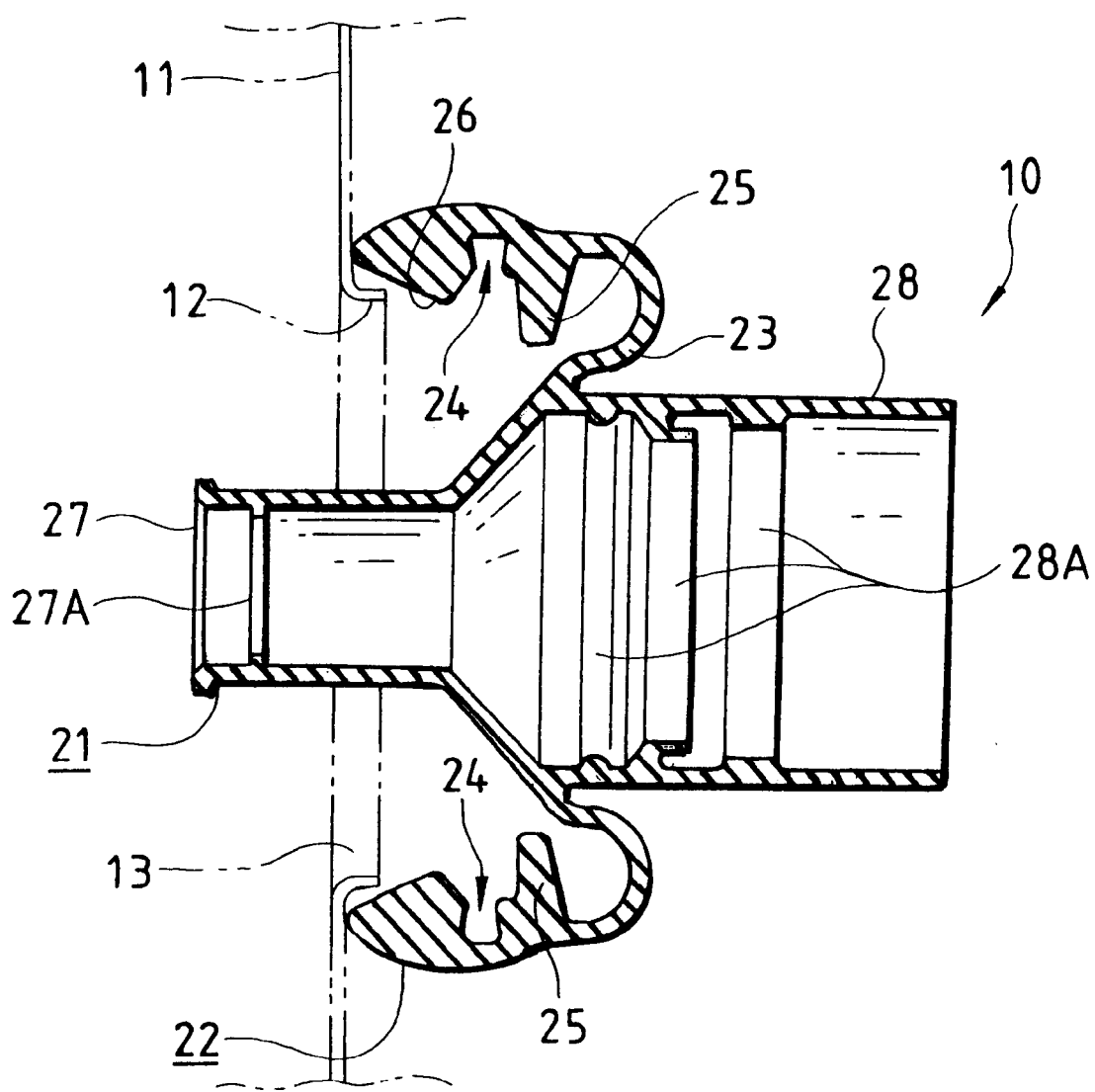
FIG. 4 is a cross-sectional view showing the initial procedure of mounting the grommet of FIGS. 1(A) and (B)

Then, as shown in FIG. 4, the grommet 10 is arranged in such a manner that the second cylindrical portion 22 covers the flange 13 of the mounting hole 12.

At this time, the inner peripheral surface of the second cylindrical portion 22, which is originally the outer peripheral surface thereof, is tapering toward the connection portion 23 because of the provision of the engagement portion 26, and therefore the grommet 10 can be positively disposed coaxially with the mounting hole 12.

Thereafter, when the wire harness (not shown) is pulled left (with respect to the drawings) relative to the car body panel 11, with the open end of the second cylindrical portion 22 held against the car body panel 11, the smaller-diameter portion 27 of the first cylindrical portion 21 is passed through the mounting hole 12 while restoring the second cylindrical portion 22 into its initial shape, which has a generally U-shaped cross-section.

At this time, even if the wire harness is pulled left (in the drawings), the wire harness will not be disengaged from the first cylindrical portion 21 of the grommet 10 since the wire harness is held or retained by the first cylindrical portion 21 through the filler.

Figure 5:
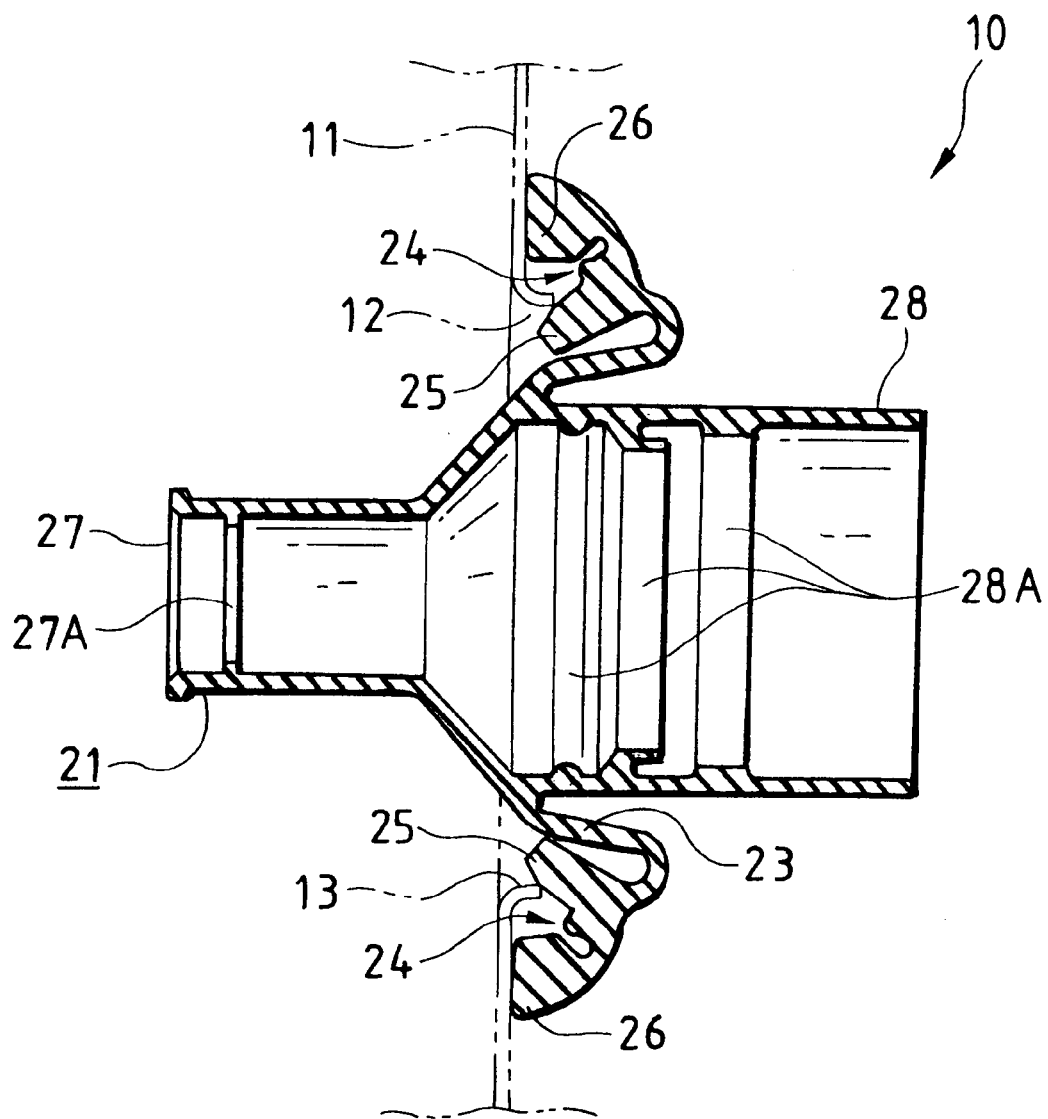
FIG. 5 is a cross-sectional view showing the procedure of mounting the grommet of FIGS. 1(A) and (B)

Then, when the wire harness is further pulled left (in the drawings), the second cylindrical portion 22 begins to be deformed in such a manner that its inner peripheral surface, which is originally the outer peripheral surface, is inverted, since the open end of the second cylindrical portion 22 is held against the car body panel 11 (see FIG. 5).

The groove 24 in the second cylindrical portion 22 is deformed into a generally triangular cross-section, and the conical surface of the engagement portion 26 is pressed against the car body panel 11, so that the flange portions 25 are deformed to converge to jointly assume a generally tapering, cylindrical shape, and the distal end portions of the flange portions 25, defining a smaller-diameter end portion of this tapering cylindrical shape, are guided into the mounting hole 12.

At this time, an external force to change the angle of projection of the flange portion 25 relative to the second cylindrical portion 22 is exerted on each flange portion 25.

Figure 6:
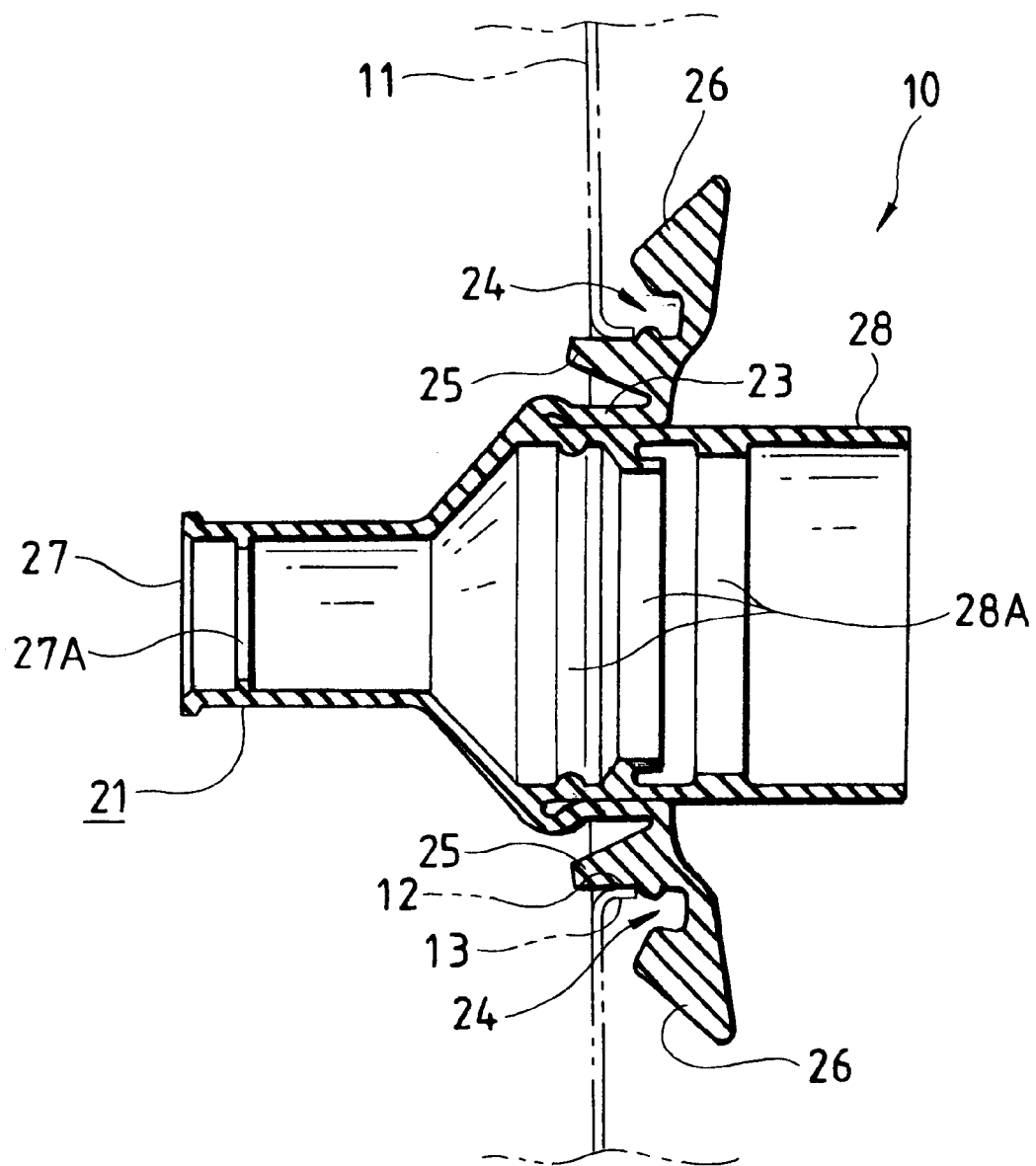
FIG. 6 is a cross-sectional view showing the procedure of mounting the grommet of FIGS. 1(A) and (B)

As shown in FIG. 6, in this condition, when the wire harness is further pulled in the left-hand direction (in the drawings), the connection portion 23 is deformed so as to come into contact with the outer peripheral surface of the larger-diameter portion 28 as the flange portions 25 are held in sliding contact with the inner peripheral edge of the mounting hole 12.

As a result, the distal end portions of the flange portions 25 pass through the mounting hole 12. At this time, the second cylindrical portion 22 is deformed to be spread toward the open end thereof, and therefore the engagement portion 26 is disengaged from the car body panel 11, and the groove 24 is restored into a generally channel-shaped cross-section (see FIG. 7).

Thereafter, the wire harness is further pulled in the left-hand direction (in the drawings), and when each of the flange portions 25 is moved into a predetermined position, a high resilient force, tending to restore the angle of projection of the flange portion 25 from the second cylindrical portion 22 into the initial angle, is released.

Figure 7:
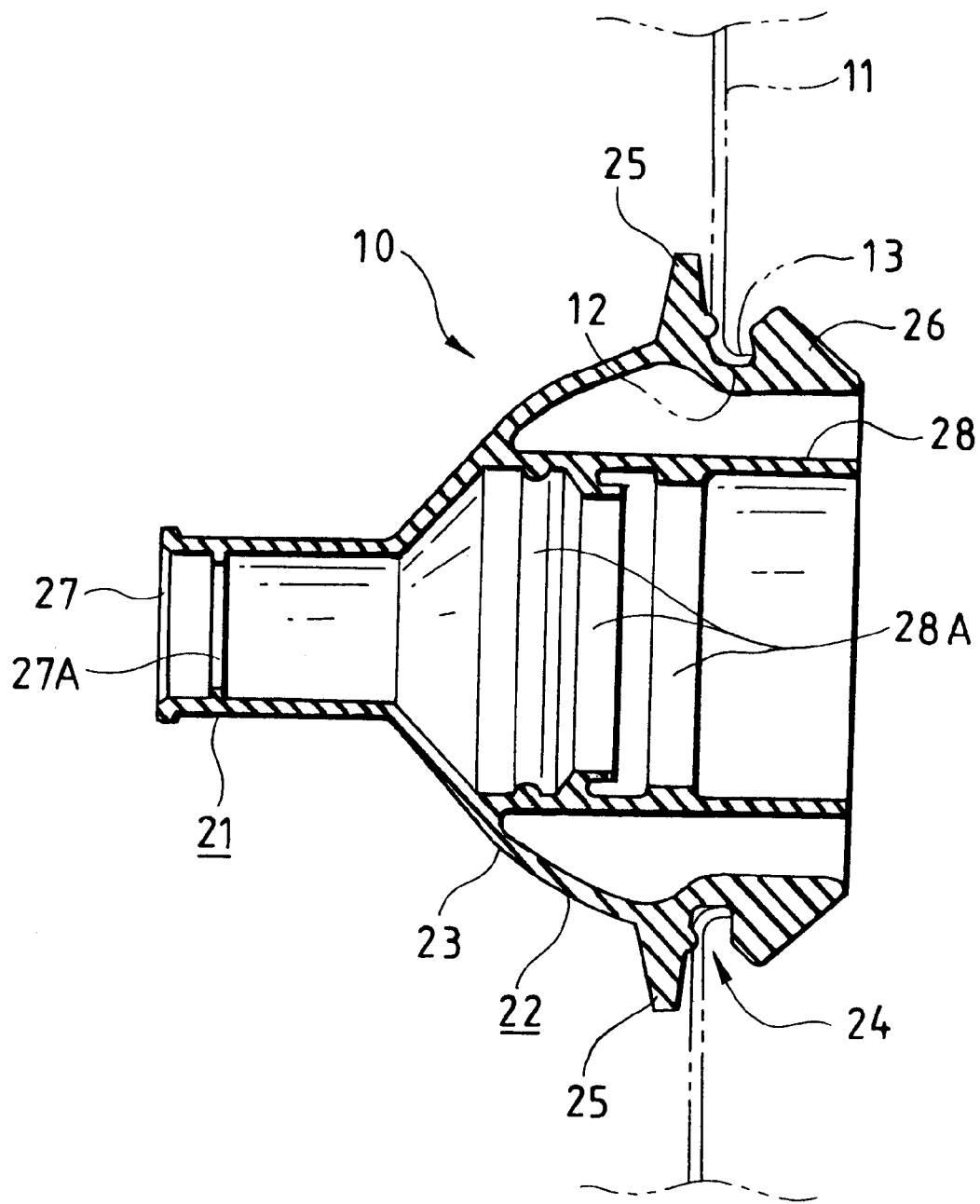
FIG. 7 is a cross-sectional view showing the procedure of mounting the grommet of FIGS. 1(A) and (B)
Figure 8:
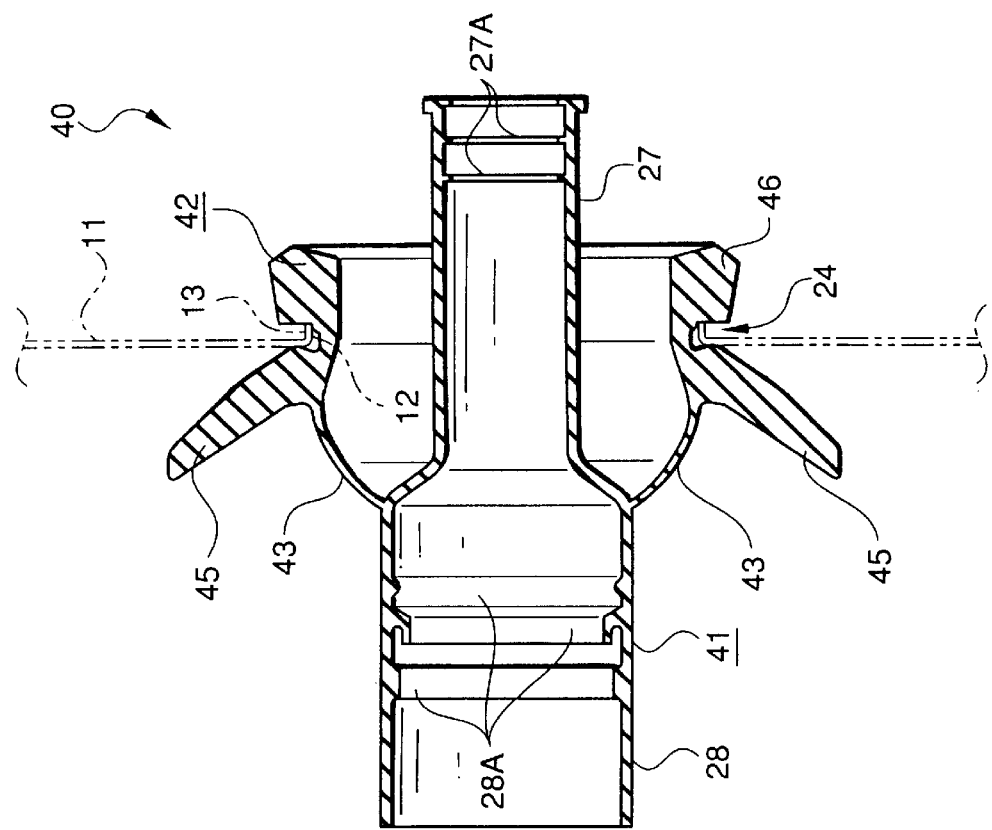
FIGS. 8(A) and 8(B) are a plan view and a cross-sectional view, respectively, of a second embodiment of a grommet of the present invention.
Figure 8:
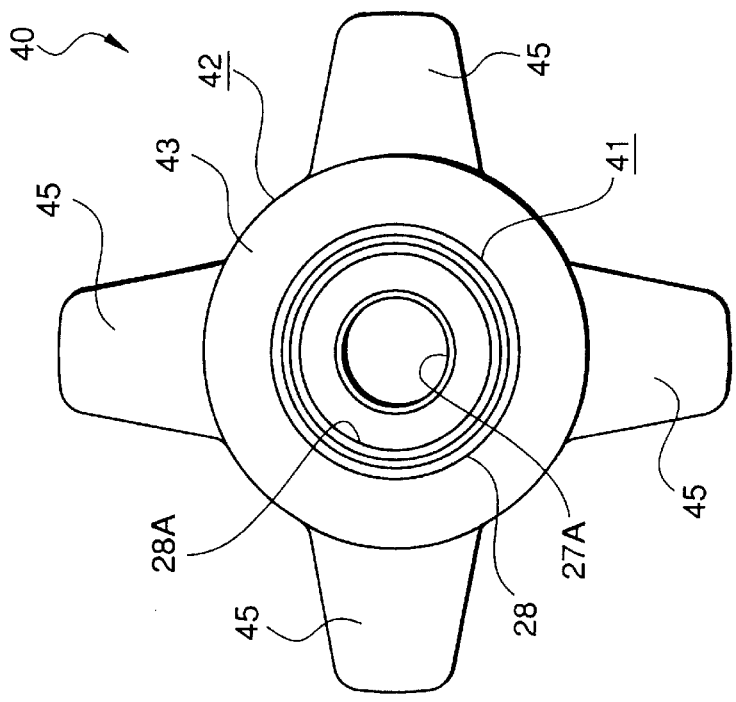
Figure 9:
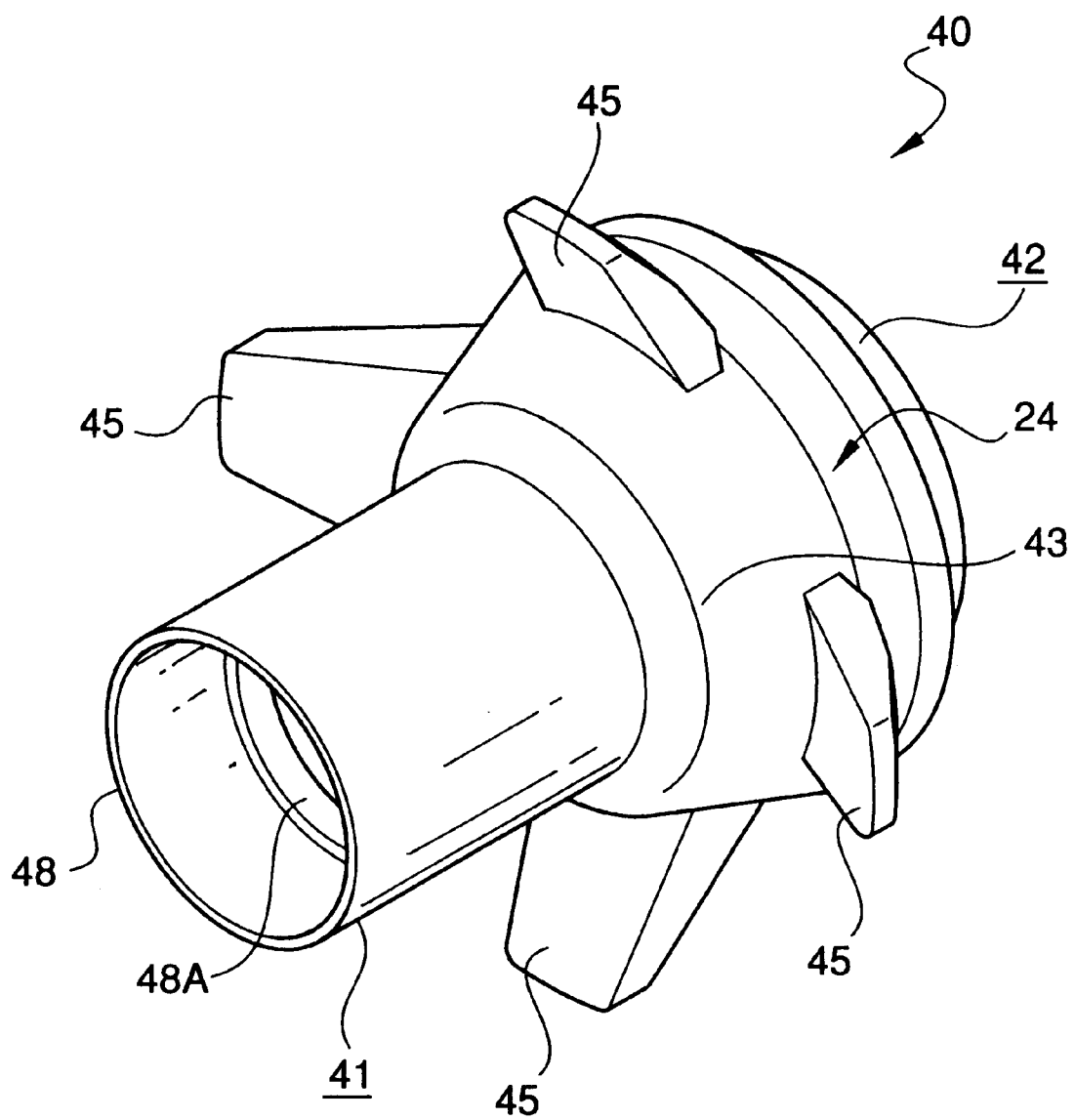
FIG. 9 is a perspective view showing the grommet of FIGS. 8(A) and 8(B)
Figure 10:
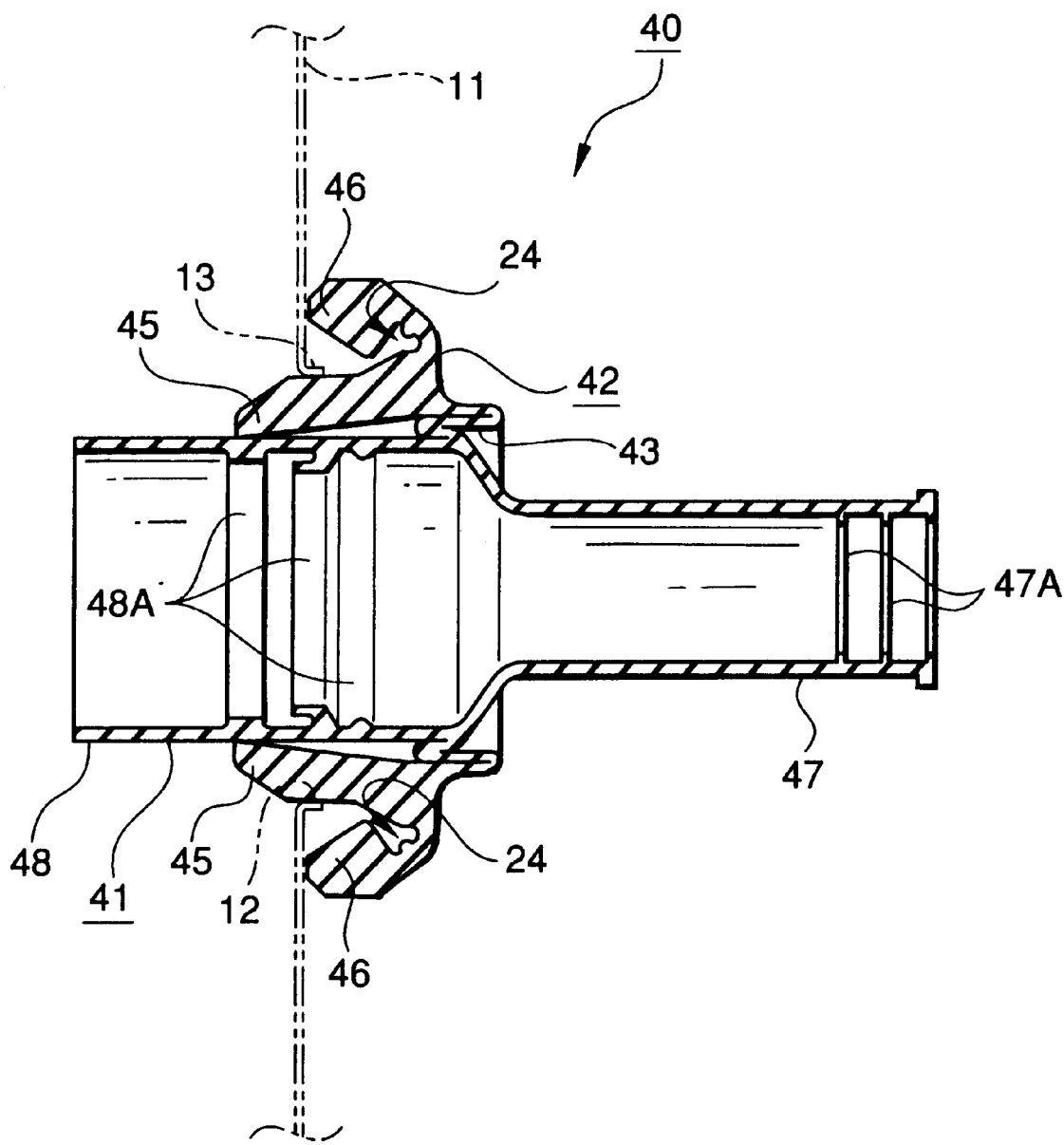
FIG. 10 is a cross-sectional view of the grommet of FIGS. 8(A) and 8(B) turned inside out.

Since the flange portions 25 are restored into the initial shape as shown in FIG. 7, they pass through the mounting hole 12 and spread, and therefore the grommet 10 is moved left (in the drawings) by itself, and the groove 24 is fitted on the flange 13 of the mounting hole 12.

In the above grommet 10, a sufficient resilient force to restore each flange portion 25 into its initial shape is produced, and therefore as compared with the conventional construction, the mounting operation can be carried out easily without the need for an auxiliary operation by the operator.

In this grommet 10, the plurality of flange portions 25 extend radially from the outer peripheral surface of the second cylindrical portion 22, and have a thickness larger than the thickness of the second cylindrical portion 22. Therefore, as compared with the case where the flange portions 25 are formed into an annular shape, irregular wrinkles are less likely to be formed on the surfaces of the flange portions 25, and therefore radial, uniform resilient forces can be obtained.

Namely, in this grommet 10, the radial, uniform resilient forces, acting to restore the second cylindrical portion 22 into its initial shape, can be obtained, and therefore there is little possibility that the groove 24 is fitted obliquely on the inner peripheral edge of the mounting hole 12, and thus, the groove 24 can be positively fitted properly thereon.

In this grommet 10, the engagement portion 26 is formed on the outer peripheral surface of the second cylindrical portion 22, and is tapered from the groove 24 toward the open end of the second cylindrical portion 22. Therefore, by fitting the inverted second cylindrical portion 22 on the flange 13 of the mounting hole 12, the second cylindrical portion 22 can be disposed coaxially with the mounting hole 12, and therefore the groove 24 can be fitted uniformly relative to the mounting hole 12.

FIGS. 8(A) to 10 show a second embodiment of a grommet 40 of the present invention.

In the embodiments to be described below, those portions, already described for FIGS. 1 to 7, will be designated by identical or like reference numerals, and explanation thereof will be simplified or omitted.

This grommet 40 includes a first cylindrical portion 41 for passing a wire harness therethrough, a connection portion 43 of a generally conical shape formed on an outer peripheral surface of the first cylindrical portion 41, a second cylindrical portion 42 connected to the first cylindrical portion 41 through the connection portion 43, a groove 24 formed in an outer peripheral surface of the second cylindrical portion 42, flange portions 45 formed on the outer peripheral surface of the second cylindrical portion 42, and an engagement portion 46 formed on that portion of the outer peripheral surface of the second cylindrical portion 42 disposed adjacent to an open end thereof.

A smaller-diameter portion 47 and a larger-diameter portion 48 are continuous with each other along a common axis, and this grommet 40 differs from the first embodiment in that the smaller-diameter portion 47 is provided within the second cylindrical portion 42.

In this grommet 40, a maximum thickness of the connection portion 43 is smaller than a minimum thickness of the second cylindrical portion 42, and the flange portions 45 project radially in a larger amount as compared with the first embodiment, and these flange portions 45 are slanting toward an open end (left end in FIG. 8(B)) of the first cylindrical portion 41.

Namely, these flange portions 45 project to be disposed on an imaginary conical surface spreading toward the open end of the first cylindrical portion 41, and the angle of projection of the flange portions 45 relative to the outer peripheral surface of the second cylindrical portion 41 can be maintained.

In this grommet 40, the angle of projection of the flange portions 45 relative to the outer peripheral surface of the second cylindrical portion 42 can be maintained, and therefore as in the above-mentioned first embodiment, the groove 24 can be easily and positively fitted on the inner peripheral edge of the mounting hole 12 in the car body panel 11, and the wire harness-mounting operation can be simplified.

In this grommet 40, the maximum thickness of the connection portion 43 is smaller than the minimum thickness of the second cylindrical portion 42, and therefore the second cylindrical portion 42 can be inverted more easily as compared with the first embodiment.

In this grommet 40, the flange portions 45 project radially from the second cylindrical portion 42 in a large amount, and are slanting toward the open end of the first cylindrical portion 41, and therefore even if the second cylindrical portion 42 is not completely inverted, the flange portions 45 are deformed to converge to jointly assume a generally tapering, cylindrical shape so that the distal end portions thereof can pass through the mounting hole 12. Thus, the flange portions 45 can be easily inserted into the mounting hole 12.

Figure 12:
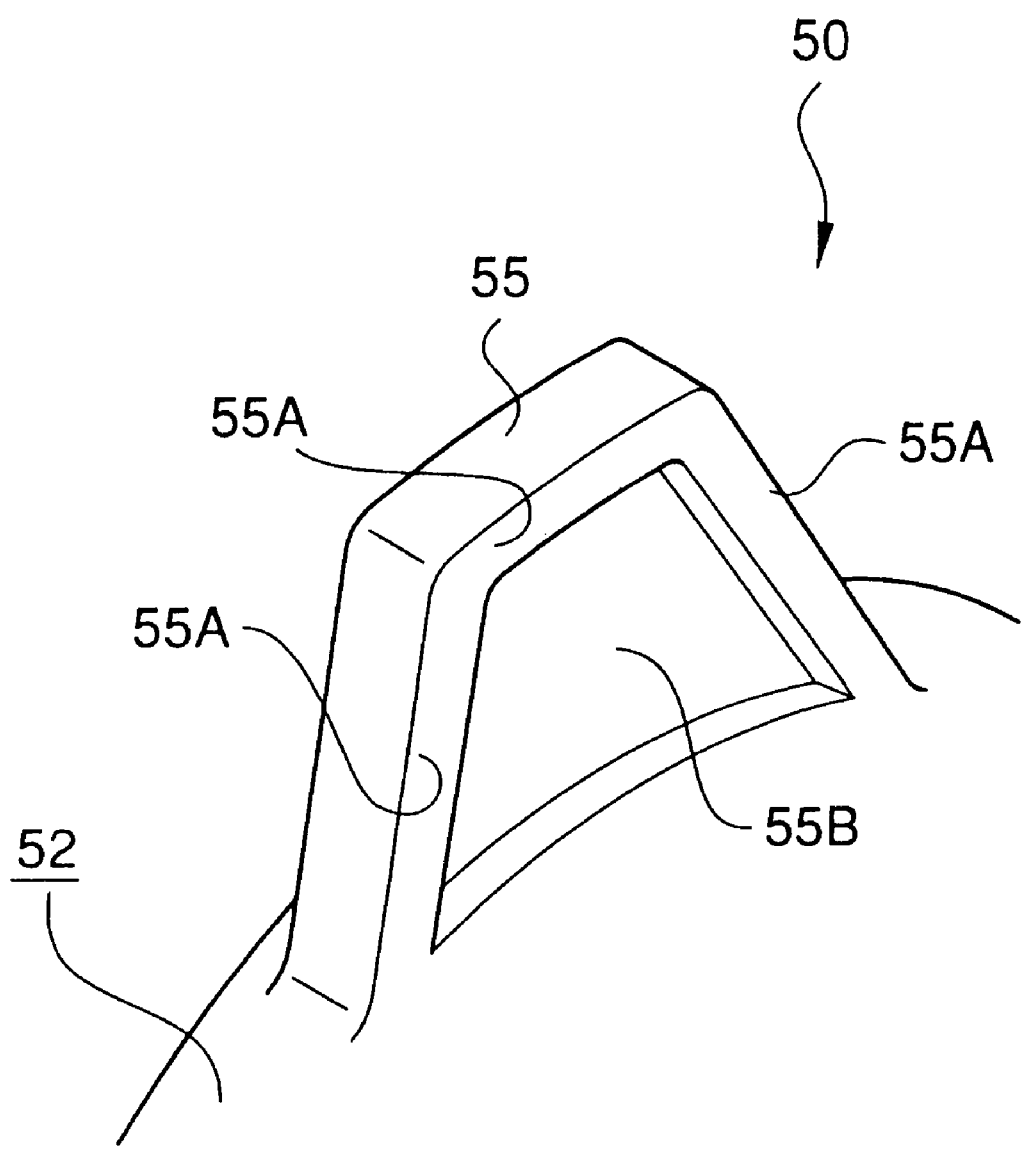
FIG. 12 is an enlarged, fragmentary, perspective view showing a flange portion of the grommet of FIGS. 11(A) and (B)

FIGS. 11(A), 11(B) and 12 show a third embodiment of a grommet 50 of the present invention.

This grommet 50 is basically similar in construction to the second embodiment, but differs from the second embodiment in that a connection portion 53 is not reduced in thickness, and that a rib 55A is formed on each of flange portions 55.

The rib 55A is formed on a sliding-contact surface of the flange portion 55 which is brought into sliding contact with the inner peripheral edge of the mounting hole 12 when a second cylindrical portion 52 is inverted. Namely, the sliding-contact surface is that surface of the flange portion 55 directed toward an open end (right end in FIG. 11(A)) of the second cylindrical portion 52.

As shown in FIG. 12, the rib 55A is formed on a peripheral edge portion of the flange portion 55 as a result of forming a recess 55B of a generally trapezoidal shape in the sliding-contact surface of the flange portion 55 in the second embodiment.

This grommet 50 is similar in basic construction to the second embodiment, and therefore the groove 24 can be easily and positively fitted on the inner peripheral edge of the mounting hole 12 in the car body panel 11, and the wire harness-mounting operation can be simplified.

In this grommet 50, the rib 55A is formed on the sliding-contact surface of each of the flange portions 55, and therefore the area of sliding contact of each flange portion 55 with the inner peripheral edge of the mounting hole 12 is smaller as compared with the second embodiment in which each of the flange portions has the flat sliding-contact surface. Therefore, an insertion resistance, developed when inserting the flange portions 55, deformed into a generally tapering cylindrical shape, into the mounting hole 12, can be greatly reduced.

Figure 13:
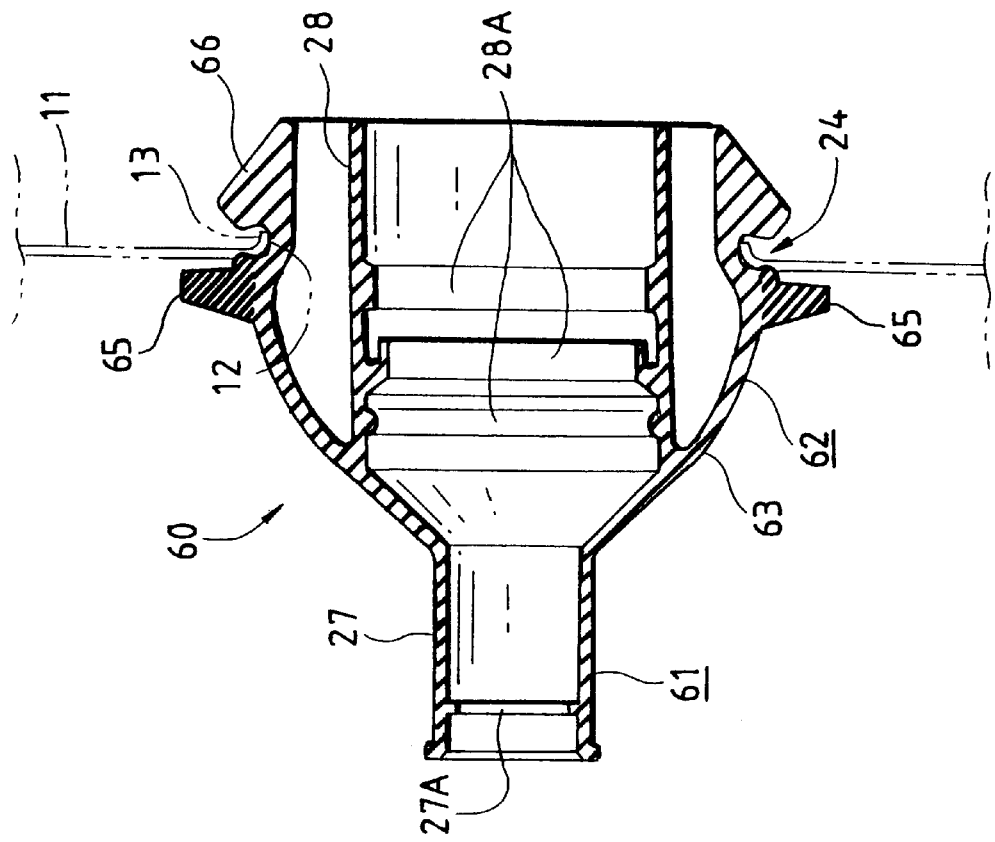
FIGS. 13 (A) and (B) are a plan view and a cross-sectional view, respectively, of a fourth embodiment of a grommet of the present invention.
Figure 13:
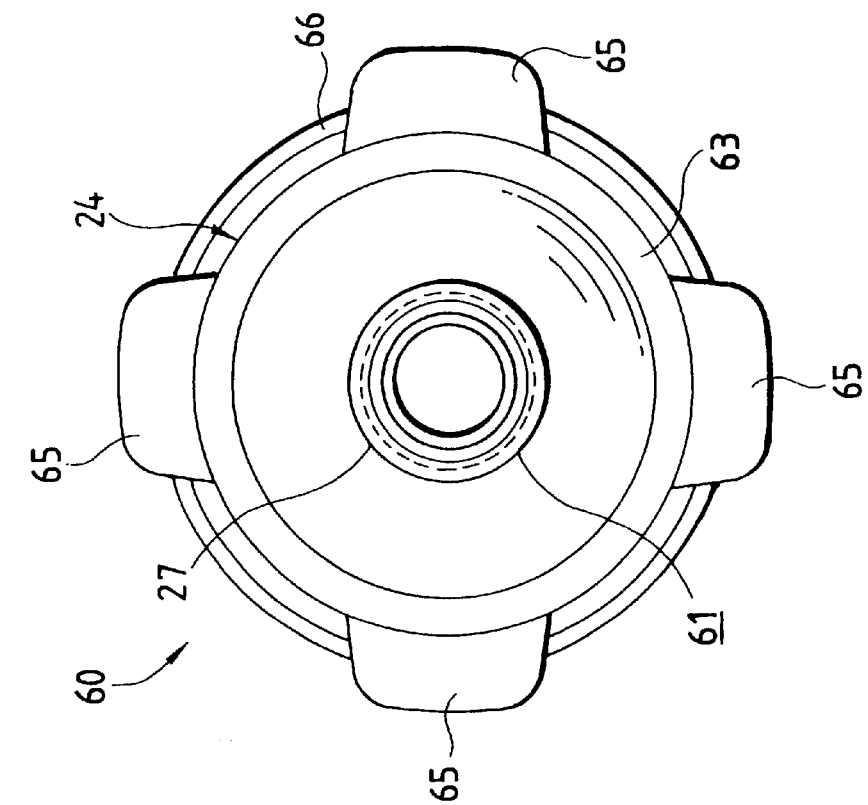

FIGS. 13(A) and (B) show a fourth embodiment of a grommet 60 of the present invention.

This grommet 60 is basically similar in construction to the first embodiment, but differs from the first embodiment in that flange portions 65 are made of a material different from a material of which the other portions are made.

More specifically, in the grommet 60, the flange portions 65 and a second cylindrical portion 62 are made of suitable rubber which is excellent in water resistance, oil resistance, corrosion resistance, insulating properties, elasticity and so on. The hardness of the flange portions 65 is higher than the hardness of the second cylindrical portion 62.

Each of the flange portions 65 can retain its position relative to the second cylindrical portion 62, its shape, and the direction of projection thereof against an external force smaller than a predetermined value.

In this grommet 60, the hardness of the flange portions 65 is higher than the hardness of the second cylindrical portion 62, and therefore the flange portions 65 are deformed in a converging (tapering) manner by applying an external force not less than a predetermined value, and are passed through the mounting hole 12, and then when the external force is released, larger resilient forces, tending to restore the second cylindrical portion 62 into its initial shape, are produced as compared with the case where the flange portions are equal in hardness to the second cylindrical portion, and as a result a groove 24 can be positively fitted properly.

The present invention is not limited to the above embodiments, and various modifications and improvements can be made, and the material, shape, dimensions, configuration, number, mounting position and etc., for the mounting plate, the mounting hole, the first cylindrical portion, the connection portion, the second cylindrical portion, the groove, the flange portions, the engagement portion, ribs and soon are arbitrary, and are not limited in so far as the present invention can be achieved.

As described above, in the present invention, the angle of projection of the flange portions relative to the outer peripheral surface of the second cylindrical portion can be maintained. Therefore, there can be obtained the large resilient forces which enable the groove to be fitted on the inner peripheral edge of the mounting hole, and an auxiliary operation by the operator as in the conventional construction is not necessary, and the mounting operation can be simplified.

In the present invention, the flange portions, extending radially from the outer peripheral surface of the second cylindrical portion, have a thickness larger than the thickness of the second cylindrical portion. Therefore, the radial, uniform large resilient forces can be obtained, and irregular wrinkles are less likely to be formed on the surfaces of the flange portions when the flange portions are deformed.

In the present invention, the engagement portion is formed on the outer peripheral surface of the second cylindrical portion, and is tapered from the groove toward the distal end of the second cylindrical portion. Therefore, when the inverted second cylindrical portion is fitted on the flange of the mounting hole, the second cylindrical portion is disposed coaxially with the mounting hole.

In the present invention, the thickness of the connection portion is smaller than the thickness of the second cylindrical portion. Therefore, the second cylindrical portion can be easily turned inside out.

In the present invention, the flange portions project to be disposed on an imaginary conical surface spreading toward the open end of the first cylindrical portion. Therefore, the flange portions can be deformed into a generally tapering shape without completely turning the second cylindrical portion inside out, and therefore the flange portions can be easily inserted into the mounting hole.

In the present invention, the rib is formed on the sliding-contact surface of the flange portion which can be brought into sliding contact with the inner peripheral edge of the mounting hole, and the rib is continuous from the proximal end of the flange portion to the distal end thereof. As compared with a flat flange portion, the area of sliding contact of the flange portion with the inner peripheral edge of the mounting hole is smaller, and an inserting resistance can be reduced, which is developed when inserting the flange portions, deformed into a generally tapering shape, into the mounting hole.

In the present invention, the flange portions are higher in hardness than the second cylindrical portion. Therefore, the flange portions are deformed in a tapering manner by applying an external force not less than a predetermined value, and are passed through the mounting hole. Thus, when the external force is released, larger resilient forces, tending to restore the second cylindrical portion into its initial shape, are produced as compared with the case where the flange portion is equal in hardness to the second cylindrical portion, and as a result the groove can be positively fitted properly.

What is claimed is:

1. A grommet for passing and holding a member relative to a mounting hole in a mounting plate, comprising:

a first cylindrical portion for initially passing the member therethrough;

a second cylindrical portion connected to said first cylindrical portion through an annular connection portion formed at an outer peripheral surface of said first cylindrical portion;

a groove portion formed in an outer peripheral surface of said second cylindrical portion; and a flange portion formed on the outer peripheral surface of said second cylindrical portion between said groove portion and said connection portion, said flange portion having an angle of projection with respect to the outer peripheral surface of said second cylindrical portion wherein the grommet is inserted into the mounting hole by said second cylindrical portion initially turning inside out so that an inner peripheral surface of said second cylindrical portion directs outwardly and a peripheral edge of said flange portion inserts into the mounting hole and said second cylindrical portion thereby restoring into its initial shape so that said first cylindrical portion passes through the mounting hole and said groove portion fits on an inner peripheral edge of the mounting hole, and wherein the angle of projection of said flange portion with respect to the outer peripheral surface of said second cylindrical portion is maintained after said groove portion is fitted on the inner peripheral edge of the mounting hole.

2. A grommet according to claim 1, wherein said flange portion is a plurality of flange portions which extend radially from the outer peripheral surface of said second cylindrical portion, and said flange portions have a thickness larger than a thickness of said second cylindrical portion.

3. A grommet according to claim 1, wherein an engagement portion is formed on the outer peripheral surface of said second cylindrical portion, and is tapered from said groove portion toward a distal end of said second cylindrical portion.

4. A grommet according to claim 1, wherein a thickness of said connection portion is smaller than the thickness of said second cylindrical portion.

5. A grommet according to claim 1, wherein said flange portion projects so as to be on a conical plane spreading toward an open end of said first cylindrical portion.

6. A grommet according to claim 1, wherein a rib is formed on a sliding-contact surface of said flange portion for slidingly contacting with the inner peripheral edge of the mounting hole, and said rib is continuous from a proximal end of said flange portion to a distal end thereof.

7. A grommet according to claim 1, wherein a material of said flange portion has a higher hardness than a material of said second cylindrical portion.

8. The grommet according to claim 1, wherein a larger diameter portion is provided within said second cylindrical portion, with a predetermined space formed therebetween, so that said second cylindrical portion has an inner diameter larger than the outer diameter of said larger diameter portion, and wherein said larger diameter portion does not turn inside out when said second cylindrical portion turns inside out.

* * * * *